United States Patent
Kwak et al.

(10) Patent No.: US 12,025,522 B2
(45) Date of Patent: Jul. 2, 2024

(54) HYBRID LARGE-AREA PRESSURE SENSOR WITH CAPACITIVE SENSOR AND RESISTIVE SENSOR INTEGRATED THEREINTO

(71) Applicant: Morethings Co., Ltd., Yongin-si (KR)

(72) Inventors: Jae Kyung Kwak, Yongin-si (KR); Ji Won Oh, Gwangju-si (KR); Hwan Il Park, Seoul (KR); Jeong Min Han, Seoul (KR)

(73) Assignee: Morethings Co., Ltd., Yongin-si (KR)

( * ) Notice: Subject to any disclaimer, the term of this patent is extended or adjusted under 35 U.S.C. 154(b) by 572 days.

(21) Appl. No.: 17/187,647

(22) Filed: Feb. 26, 2021

(65) Prior Publication Data

US 2021/0181049 A1    Jun. 17, 2021

Related U.S. Application Data

(63) Continuation of application No. PCT/KR2018/013519, filed on Nov. 8, 2018.

(30) Foreign Application Priority Data

Aug. 27, 2018    (KR) .................. 10-2018-0100114

(51) Int. Cl.
*G01L 5/16*    (2020.01)
*B60R 21/015*    (2006.01)
(Continued)

(52) U.S. Cl.
CPC .............. *G01L 5/16* (2013.01); *B60R 21/015* (2013.01); *G01G 19/4142* (2013.01);
(Continued)

(58) Field of Classification Search
CPC ... G01L 5/16; G01L 1/146; G01L 1/20; G01L 1/2218; G06F 3/0414; G06F 3/044; B60R 21/015; G01G 19/4142
(Continued)

(56) References Cited

U.S. PATENT DOCUMENTS 7,958,789 B2 *    6/2011    Hayakawa ............... G01B 7/22
                                            73/862.626
8,997,588 B2 *    4/2015    Taylor .................. A61B 5/6892
                                            73/862.041
(Continued)

FOREIGN PATENT DOCUMENTS

JP        2003139630 A  *   5/2003
JP        2003139630 A       5/2003
(Continued)

OTHER PUBLICATIONS

Office Action issued in JP 2018-212204; mailed by the Japanese Patent Office on Aug. 13, 2019.
(Continued)

*Primary Examiner* — Stephanie E Bloss
*Assistant Examiner* — Kevin C Butler
(74) *Attorney, Agent, or Firm* — Studebaker & Brackett PC

(57) ABSTRACT

A hybrid large-area pressure sensor with a capacitive sensor and a resistive sensor integrated thereinto. The sensor includes a first electrode pattern, a second electrode pattern spaced apart from the first electrode pattern by a predetermined distance, a third electrode pattern spaced apart from the second electrode pattern by a predetermined distance, and a controller, wherein a part of the first electrode pattern, a predetermined unit area of the second electrode pattern, and a predetermined unit area of the third electrode pattern form a single unit sensing cell, a change in distance between
(Continued)

the first electrode pattern and the second electrode pattern causes a change in the capacitance of the second electrode pattern, a contact between the second electrode pattern and the third electrode pattern causes a change in the resistance of the second electrode pattern.

15 Claims, 6 Drawing Sheets

(51) Int. Cl.
    *G01G 19/414*     (2006.01)
    *G01L 1/14*     (2006.01)
    *G01L 1/20*     (2006.01)
    *G01L 1/22*     (2006.01)
    *G06F 3/041*     (2006.01)
    *G06F 3/044*     (2006.01)

(52) U.S. Cl.
    CPC .............. *G01L 1/146* (2013.01); *G01L 1/20* (2013.01); *G01L 1/2218* (2013.01); *G06F 3/0414* (2013.01); *G06F 3/044* (2013.01)

(58) Field of Classification Search
    USPC ................................................ 73/862.381
    See application file for complete search history.

(56) References Cited

U.S. PATENT DOCUMENTS

| | | | |
|---|---|---|---|
| 9,459,160 B2 * | 10/2016 | Shaw | G06F 3/044 |
| 9,952,106 B2 | 4/2018 | Shaw et al. | |
| 10,760,982 B2 * | 9/2020 | Watazu | G01L 5/165 |
| 11,191,472 B2 * | 12/2021 | Shu | B32B 3/08 |
| 2005/0257628 A1 * | 11/2005 | Nikaido | H01H 3/141 |
| | | | 73/862.541 |
| 2011/0227863 A1 * | 9/2011 | Cheng | G06F 3/0445 |
| | | | 345/174 |
| 2014/0090489 A1 * | 4/2014 | Taylor | G01L 1/142 |
| | | | 73/862.626 |
| 2021/0181049 A1 * | 6/2021 | Kwak | G01L 1/205 |
| 2022/0163415 A1 * | 5/2022 | Fang | G01L 1/146 |

FOREIGN PATENT DOCUMENTS

| | | | | |
|---|---|---|---|---|
| JP | 2005353565 A | * | 12/2005 | ............. B60N 2/002 |
| JP | 2005353565 A | | 12/2005 | |
| JP | 2006343141 A | * | 12/2006 | |
| JP | 2006343141 A | | 12/2006 | |
| JP | 2007171059 A | * | 7/2007 | |
| JP | 2007171059 A | | 7/2007 | |
| JP | 4463653 B2 | * | 5/2010 | |
| JP | 5782582 B1 | * | 9/2015 | |
| JP | 2015232490 A | * | 12/2015 | |
| JP | 2015232490 A | | 12/2015 | |
| JP | 2016113867 A | | 6/2016 | |
| JP | 2017156126 A | * | 9/2017 | |
| JP | 2018063234 A | * | 4/2018 | |
| JP | 2018063234 A | | 4/2018 | |
| JP | 6632688 B1 | * | 1/2020 | |
| KR | 20180051406 A | | 5/2018 | |
| KR | 20200134582 A | * | 12/2020 | |
| KR | 102555518 B1 | * | 2/2023 | |
| WO | WO-2014204323 A1 | * | 12/2014 | |
| WO | 2015098725 A1 | | 7/2015 | |
| WO | WO-2015098725 A1 | * | 7/2015 | |
| WO | WO-2020258061 A1 | * | 12/2020 | |

OTHER PUBLICATIONS

International Search Report issued in PCT/KR2018/013519; mailed May 23, 2019.

* cited by examiner

HYBRID LARGE-AREA PRESSURE SENSOR WITH CAPACITIVE SENSOR AND RESISTIVE SENSOR INTEGRATED THEREINTO

CROSS-REFERENCE TO RELATED APPLICATION

The present application is a continuation of International Patent Application No. PCT/KR2018/013519, filed on Nov. 8, 2018, which is based upon and claims the benefit of priority to Korean Patent Application No. 10-2018-0100114 filed on Aug. 27, 2018. The disclosures of the above-listed applications are hereby incorporated by reference herein in their entirety.

BACKGROUND

1. Technical Field

The present disclosure relates to a hybrid large-area pressure sensor with a capacitive sensor and a resistive sensor integrated thereinto.

2. Description of Related Art

In recent years, the interest in healthcare has been increasing, and the interest in healthcare is changing the paradigm from a focus on treatment to a focus on prevention, and from a focus on disease to a focus on management. Pressure sensors have been developed for yoga mats, standing mats, walking insoles, golf mats, and walking analysis mats that can sense health and exercise conditions reflecting the changes of the times. However, there are deficiencies that it is difficult to develop a large area with the technology applied to the existing pressure sensor, and the area to be sensed and the intensity of the pressure cannot be detected simultaneously. Therefore, there is a demand for technology development that can solve such deficiencies.

SUMMARY

Various aspects of the present disclosure provide a hybrid large-area pressure sensor with a capacitive sensor and a resistive sensor integrated thereinto.

The aspects of the present disclosure are not limited to the above-mentioned aspects, and other aspects, which are not mentioned, will be clearly understood by those skilled in the art from the following description.

A hybrid large-area pressure sensor with a capacitive sensor and a resistive sensor integrated thereinto according to a first aspect of the present disclosure includes a first electrode pattern, a second electrode pattern disposed below the first electrode pattern to be spaced apart from the first electrode pattern by a predetermined distance, a third electrode pattern disposed below the second electrode pattern to be spaced apart from the second electrode pattern by a predetermined distance, and a controller, wherein a part of the first electrode pattern, a predetermined unit area of the second electrode pattern, and a predetermined unit area of the third electrode pattern form a single unit sensing cell, a change in distance between the first electrode pattern and the second electrode pattern causes a change in the capacitance of the second electrode pattern, a contact between the second electrode pattern and the third electrode pattern causes a change in the resistance of the second electrode pattern, and the controller senses pressure corresponding to the unit sensing cell by using the change in the capacitance and the change in the resistance.

In one embodiment, the first electrode pattern includes a plurality of first conductive lines spaced apart from each other and extended in parallel in one direction, and at least one first conductive line among the plurality of first conductive lines is disposed in parallel with a plurality of unit areas of the second electrode pattern, and includes a wiring connecting the plurality of first conductive lines to the controller.

In one embodiment, the unit areas of the second electrode pattern include a second conductive line and a third conductive line spaced apart from each other and disposed in a complementary shape, and include a wiring connecting the second conductive line and the third conductive line to the controller.

In one embodiment, the controller transmits a first driving signal of a first frequency to the first electrode pattern, and transmits a second driving signal of a second frequency to the second electrode pattern, and the first frequency and the second frequency have each of different ranges.

In one embodiment, the first driving signal transmitted to the first electrode pattern has a high frequency, and the second driving signal transmitted to the second electrode pattern has a low frequency.

In one embodiment, the controller receives a first sensing signal corresponding to the first driving signal from the second electrode pattern in order to detect a change in the capacitance and receives a second sensing signal corresponding to the second driving signal from the second electrode pattern in order to detect a change in the resistance.

In one embodiment, the controller further includes a sensing signal comparing unit that compares the first sensing signal and the second sensing signal, wherein the sensing signal comparing unit compares the first sensing signal and the second sensing signal to generate a signal for complementing for the misalignment of the unit sensing cell.

In one embodiment, the unit area of the third electrode pattern includes a plurality of conductive island patterns spaced apart from each other.

In one embodiment, the hybrid large-area pressure sensor further includes a first sheet having the first electrode pattern formed on one surface and the second electrode pattern formed on another surface opposite to the one surface, wherein the first sheet is made of a soft insulating material.

In one embodiment, the hybrid large-area pressure sensor further includes a second sheet having the third electrode pattern formed on one surface, and the second sheet is made of a soft insulating material.

In one embodiment, the hybrid large-area pressure sensor further includes a spacer layer having a plurality of first holes interposed between the second electrode pattern and the third electrode pattern and corresponding to the unit area of the second electrode pattern and the unit area of the third electrode pattern.

In one embodiment, the spacer layer includes a jump line connecting at least part of the plurality of unit areas of the second electrode pattern to each other.

In one embodiment, the second electrode pattern, the third electrode pattern, and the spacer layer are attached to one another by an adhesive layer, and further includes a buffer layer for preventing a peel-off phenomenon of the adhesive layer.

In one embodiment, the controller further includes a resistance variable amplifier, and the resistance variable amplifier generates a complementation signal for complementing a resistance value according to a location of the unit sensing cell.

In one embodiment, the controller further includes a capacitive variable amplifier, wherein the capacitive variable amplifier measures a charging or discharging time of a capacitance according to a location of the unit sensing cell, extracts a resistance value according to a location of the unit sensing cell using the time, and generates a complementation signal using the resistance value.

In one embodiment, the first electrode pattern, the second electrode pattern, and the third electrode pattern are made of at least one conductive material among gold, silver, copper, carbon, nanotube, and graphene.

Other details of the present disclosure are included in the detailed description and drawings.

According to the hybrid large-area pressure sensor with a capacitive sensor and a resistive sensor integrated thereinto of an embodiment of the present disclosure, the capacitive sensor can sense a change in pressure intensity, but cannot sense a change in the area to be sensed, and the resistive sensor can sense a change in the area to be sensed, but cannot sense a change in pressure intensity. Accordingly, an embodiment of the present disclosure is configured to be capable of sensing both a change in the area to be sensed and a change in pressure intensity by combining a capacitive sensor and a resistive sensor to complement for mutual disadvantages.

In addition, an embodiment of the present disclosure complements for a difference in resistance due to the position of a sensing cell generated in a large-area pressure sensor by using a resistance variable amplifier and an capacitive variable amplifier to transmit a driving signal or receive a sensing signal.

In addition, an embodiment of the present disclosure uses a sensing signal comparing unit to detect a distortion signal due to sheet bending and warpage generated in a structure in which multiple sheets are combined and transmit a driving signal to complement for the same or receive a sensing signal.

The advantages of the present disclosure are not limited to the above-mentioned advantages, and other advantages, which are not mentioned, will be clearly understood by those skilled in the art from the following description.

DETAILED DESCRIPTION

Figure 1:
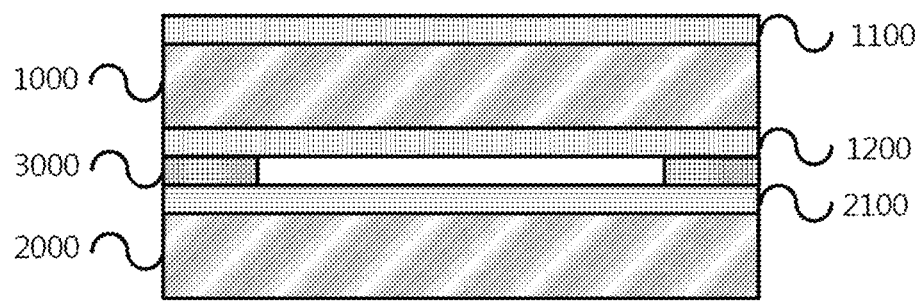
FIG. 1 is an exemplary cross-sectional view of a hybrid large-area pressure sensor with a capacitive sensor and a resistive sensor integrated thereinto according to an embodiment of the present disclosure.

Advantages, features, and methods of accomplishing the same of the preset disclosure will become apparent with reference to embodiments described in detail below together with the accompanying drawings. However, the present disclosure is not limited by embodiments disclosed hereinafter, and may be implemented in various forms. Rather, these embodiments are provided to so that this disclosure will be through and complete and will fully convey the scope of the present disclosure to those skilled in the technical field to which the present disclosure pertains, and the present disclosure will only be defined by the appended claims.

Terms used in the specification are used to describe embodiments of the present disclosure and are not intended to limit the scope of the present disclosure. In the specification, the terms of a singular form may include plural forms unless otherwise specified. The expressions "comprise" and/or "comprising" used herein indicate existence of one or more other elements other than stated elements but do not exclude presence of additional elements. Like reference denotations refer to like elements throughout the specification. As used herein, the term "and/or" includes each and all combinations of one or more of the mentioned components. It will be understood that, although the terms "first", "second", etc., may be used herein to describe various components, these components should not be limited by these terms. These terms are only used to distinguish one component from another component. Accordingly, a first component mentioned below could be termed a second component without departing from the technical ideas of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

An embodiment of the present disclosure relates to a hybrid large-area pressure sensor with a capacitive sensor and a resistive sensor integrated thereinto.

When a pressure of a body or a specific object is applied, the capacitive sensor senses a change in capacitance caused by a change in an insulator (a first sheet 1000 in the drawing) distance between a driving electrode (a first conductive line 1110 in the drawing) and a sensing electrode (a third conductive line 1212 in the drawing). A change in pressure intensity can be sensed only by a capacitive sensor, but a change in the area to be sensed cannot be sensed.

When a pressure of a body or a specific object is applied, the resistive sensor senses a change in resistance caused by a change in the area in which the driving electrode (a second conductive line 1211 in the drawing) and the sensing electrode (a third conductive line 1212 in the drawing) are in contact with other electrodes (a conductive island pattern 2110 in the drawing) spaced apart by the spacer layer 3000. A change in the area to be sensed can be sensed only by a resistive sensor, but a change in pressure intensity cannot be sensed.

An embodiment of the present disclosure is directed to a large-area pressure sensor that combines a capacitive sensor and a resistive sensor to complement mutual disadvantages, so as to sense both a change in area and a change in pressure intensity. In an embodiment of the present disclosure, the same sensing electrode is used in combining the capacitive sensor and the resistive sensor. Accordingly, the present disclosure is a technique suitable for a large-area pressure sensor in which two sensors can exhibit a synergistic effect by an organic combination, not a simple combination of two sensors.

Hereinafter, embodiments of the present disclosure will be described in detail with reference to the accompanying drawings.

FIG. 1 is an exemplary cross-sectional view of a hybrid large-area pressure sensor with a capacitive sensor and a resistive sensor integrated thereinto according to an embodiment of the present disclosure.

Referring to FIG. 1, a hybrid large-area pressure sensor with a capacitive sensor and a resistive sensor integrated thereinto includes a first sheet 1000, a second sheet 2000, a spacer layer 3000, a first electrode pattern 1100, and a second electrode pattern 1200, and a third electrode pattern 2100.

The first electrode pattern 1100 may be formed on one surface of the first sheet 1000. For example, the first electrode pattern 1100 may be located on the upper part of the first sheet 1000. The second electrode pattern 1200 may be formed on the other surface opposite to the first electrode pattern 1100 of the first sheet 1000. For example, the second electrode pattern 1200 may be located on the lower part of the first sheet 1000 and may be spaced apart from the first electrode pattern 1100 by a predetermined distance.

The third electrode pattern 2100 may be formed on one surface opposite to the second electrode pattern 1200 of the second sheet 2000. For example, the third electrode pattern 2100 may be located on the upper part of the second sheet 2000 and may be spaced apart from the second electrode pattern 1200 by a predetermined distance.

The spacer layer 3000 may be disposed between the first sheet 1000 and the second sheet 2000 to separate the second electrode pattern 1200 and the third electrode pattern 2100 by a predetermined distance.

The first sheet 1000, the second sheet 2000, and the spacer layer 3000 may be made of a soft insulating material. For example, the first sheet 1000 and the second sheet 2000 may be a film, a fiber, or the like, but are not limited thereto.

A part of the first electrode pattern 1100, a predetermined unit area of the second electrode pattern 1200, and a predetermined unit area of the third electrode pattern 2100 form a single unit sensing cell 1210. The unit sensing cell 1210 includes a capacitive sensing cell 1210 and a resistive sensing cell 1210. For example, the sensing cell 1210 may be a group of patterns in which one conductive line among the first electrode patterns 1100 and a pattern having a complementary shape among the second electrode patterns and one conductive island pattern 2110 among the third electrode patterns 2110 are vertically at the same position.

The first sheet 1000, the second sheet 2000, and the spacer layer 3000 may be attached to each other by an adhesive layer. A buffer layer may be further provided between the adhesive layer and each of the first sheet 1000, the second sheet 2000, and the spacer layer 3000 to prevent a peel-off phenomenon of the adhesive layer. The buffer layer has the function of overcoming the difference in physical properties of the first sheet 1000, the second sheet 2000, and the spacer layer 3000 to prevent a peel-off phenomenon of the adhesive layer. For example, after the first sheet 1000, the second sheet 2000, and the spacer layer 3000 are attached to each other, in a high temperature or high humidity environment, or in a state where each sheet is bent or twisted, a phenomenon in which the adhesive layer is peeled off due to a difference in physical properties of each sheet may occur. The buffer layer complements the difference in physical properties between the first sheet 1000, the second sheet 2000, and the spacer layer 3000, and can prevent such a peel-off phenomenon of the adhesive layer. For example, since the buffer layer is made of a material that is fluid with respect to tensile force, the buffer layer may be a material that is stretched when the first sheet 1000, second sheet 2000, and spacer layer 3000 are bent or twisted, and restored to an original shape when the bending or twisting of the first sheet 1000, second sheet 2000, and spacer layer 3000 are resolved.

In addition, the buffer layer can prevent a peel-off phenomenon of the adhesive layer that may occur during a manufacturing process of the sensor cell. The process may include an operation of stabilizing the first electrode pattern 1100, the second electrode pattern 1200, and the third electrode pattern 2100 at a predetermined high temperature before and after a process of depositing, coating, or printing, and after a sensor manufacturing process is completed. In the stabilizing operation at a high temperature, each sheet and each electrode pattern may expand or contract while having different expansion or contraction rates. Accordingly, a material that may complement for different expansion or contraction rates may be included between each sheet and the electrode pattern.

The upper part of the first electrode pattern 1100 may further include a protective film. When the first electrode pattern 1100 is exposed to the upper part, the first electrode pattern 1100 may be corroded by moisture, may be contaminated by foreign matter, and a phenomenon that the first electrode pattern 1100 may be peeled off may occur. A protective film for preventing such a phenomenon may be attached to the upper part of the first electrode pattern 1100.

The upper part of the first electrode pattern 1100 may further include a light emitting film. When a user uses the pressure sensor of an embodiment of the present disclosure, it may be used as a mat for detecting an exercise posture such as yoga or golf. Accordingly, an embodiment of the present disclosure includes a light emitting film that may suitably emit light according to the movement of the user, so that accurate information can be shown to the user in real time, and the user can feel interest in exercising. For example, in the golf swing posture, the light emitting film may emit light in the vicinity of the left sole when more force is applied to the left sole.

Figure 2:
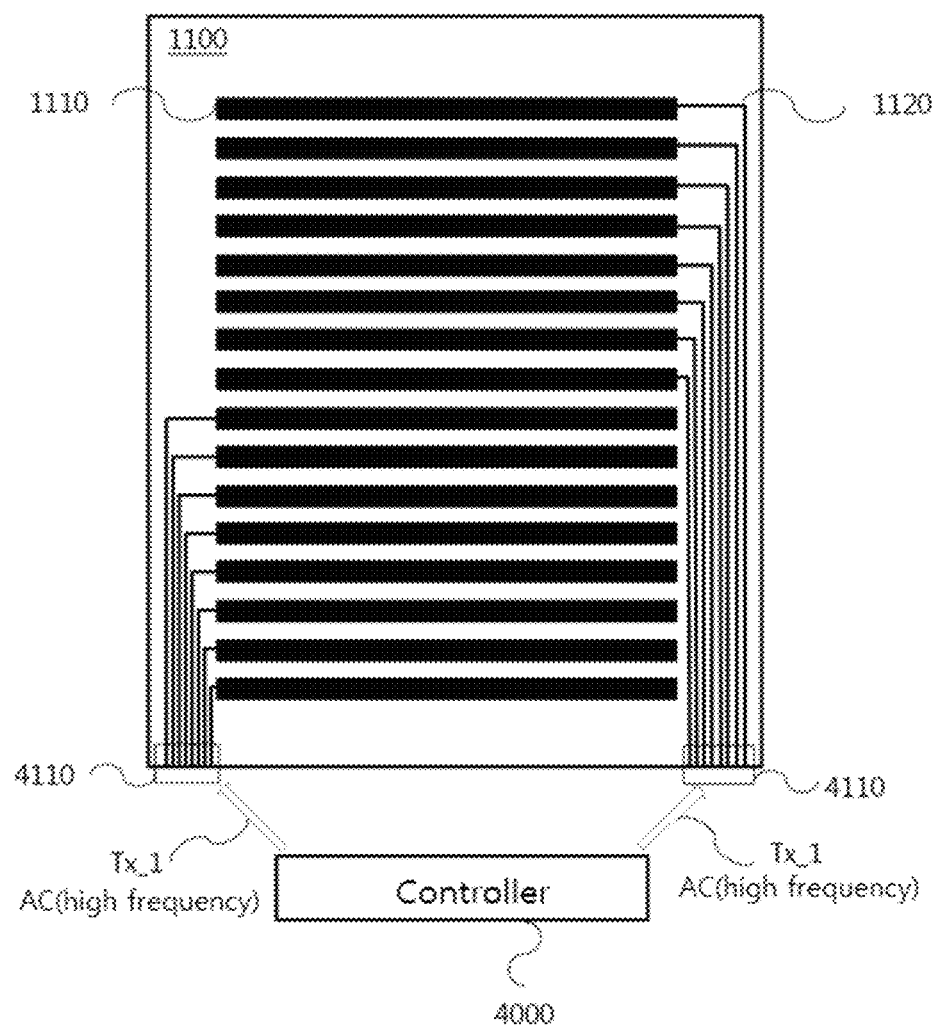
FIG. 2 is an exemplary plan view of a first electrode pattern according to an embodiment of the present disclosure.

FIG. 2 is an exemplary plan view of a first electrode pattern according to an embodiment of the present disclosure.

Referring to FIG. 2, the first electrode pattern 1100 includes a plurality of first conductive lines 1110 and a plurality of wirings 1120 connecting the first conductive lines 1110 to the controller 4000.

The first electrode pattern 1100 includes a plurality of first conductive lines 1110 spaced apart from each other and extended in parallel in one direction. At least one first conductive line 1110 among a plurality of first conductive lines 1110 is disposed in parallel with a plurality of unit areas of the second electrode pattern 1200. In addition, the first electrode pattern 1100 includes a wiring 1120 connecting a plurality of first conductive lines 1110 to the first connection part 4110. The wiring 1120 is connected to the controller 4000 through the first connection part 4110.

In some embodiments, in the first electrode pattern 1100, some of the plurality of wirings 1120 that transmit the first driving signal transmitted from the controller 4000 to the first conductive line 1110 are located on a first bezel (a left bezel of FIG. 2), and some of the rest may be located on a second bezel (a right bezel of FIG. 2). For example, if there are 16 first conductive lines 1110, the first to sixth first conductive lines 1110 are connected by a wiring 1120 located on the first bezel, and the seventh to sixteenth first conductive lines 1110 may be connected by a wiring 1120 located on the second bezel. Alternatively, even-numbered first conductive lines 1110 may be connected by a wiring 1120 located on the first bezel, and odd-numbered first conductive lines 1110 may be connected by a wiring 1120 located on the second bezel.

In some other embodiments, in the first electrode pattern 1100, a plurality of wirings 1120 for transmitting a first driving signal to the first conductive line 1110 may be connected through a plurality of third holes of the first sheet 1000 and a plurality of second holes 3200 of the spacer layer 3000. For example, a part of the wiring 1120 is formed on a sheet or a layer other than the first sheet 1000, and may be connected to the rest part of the wiring 1120 on the first sheet 1000 through a plurality of second holes 3200 of the spacer layer 3000 or a plurality of third holes of the first sheet 1000 located at positions corresponding to each of the plurality of first conductive lines 1110.

In some embodiments, the first conductive lines 1110 may be disposed in a horizontal or vertical direction.

The first electrode pattern 1100 may be made of a conductive material. For example, the first electrode pattern 1100 may be gold, silver, copper, carbon, nanotube, and graphene, but is not limited thereto.

The controller 4000 transmits a plurality of electrical signals (Tx_1) to the plurality of first conductive lines 1110. The controller 4000 transmits a plurality of high-frequency first driving signals corresponding to capacitively sensing pressure to the plurality of first conductive lines 1110. The high frequency first driving signal may pass between the first conductive line 1110 and the third conductive line 1212 where the capacitance is formed.

Figure 3:
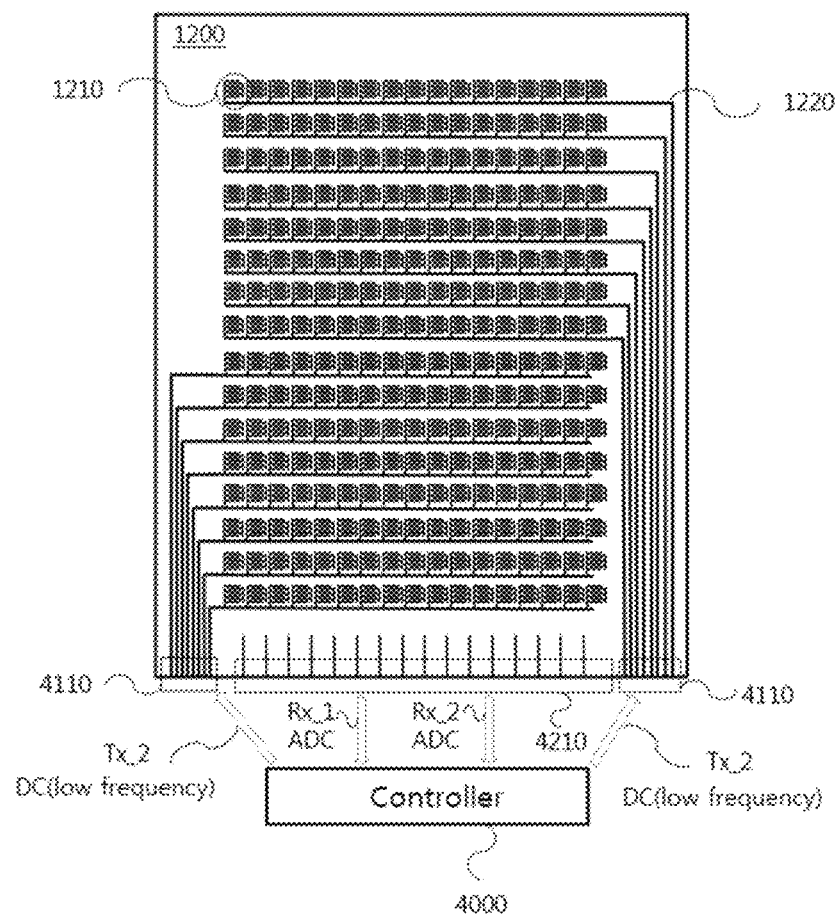
FIG. 3 is an exemplary plan view of a second electrode pattern according to an embodiment of the present disclosure.

FIG. 3 is an exemplary plan view of a second electrode pattern according to an embodiment of the present disclosure.

Referring to FIG. 3, the second electrode pattern 1200 includes a plurality of second conductive lines 1211, a plurality of third conductive lines 1212, and a plurality of wirings 1220 connecting the second conductive lines 1211 to the controller 4000, and a plurality of wirings 1220 connecting the third conductive line 1212 to the controller 4000. The plurality of wirings 1220 connecting the third conductive line 1212 to the controller 4000 may be disposed on the second electrode pattern 1200 or may be disposed on the spacer layer 3000.

The second electrode pattern 1200 includes a second conductive line 1211 and a third conductive line 1212 spaced apart from each other and disposed in a complementary shape. A part of the second conductive line 1211 and a part of the third conductive line 1212 may be formed in a complementary shape. The complementary shape is a predetermined unit area of the second electrode pattern 1200 and a predetermined unit area of the third electrode pattern 2100, and becomes a part of a single unit sensing cell 1210 of a part of the first electrode pattern 1100, a predetermined unit area of the second electrode pattern 1200, and a predetermined unit area of the third electrode pattern 2100. The number of the sensing cells 1210 may be determined by the number of the second conductive lines 1211 and the third conductive lines 1212. For example, if the number of the second conductive lines 1211 is N and the number of the third conductive lines 1212 is M, the number of sensing cells 1210 is N*M.

In addition, the second electrode pattern 1200 may include a wiring 1220 that connects the plurality of second conductive lines 1211 to the first connection part 4110. In addition, the second electrode pattern 1200 may include a wiring 1220 that connects the plurality of third conductive lines 1212 to the second connection part 4210. A wiring 1220 connecting the plurality of third conductive lines 1212 to the second connection part 4210 may be formed in the spacer layer 3000, and may be connected to the wiring 1220 of the second electrode pattern 1200 through the jump line of the spacer layer 3000 and the second hole 3200. The wiring 1220 is connected to the controller 4000 through the first connection part 4110 and the second connection part 4210.

In some embodiments, in the second electrode pattern 1100, some of the plurality of wirings 1220 that transmit the second driving signal transmitted from the controller 4000 to the second conductive line 1211 are located on a first bezel (a left bezel of FIG. 3), and some of the rest may be located on a second bezel (a right bezel of FIG. 3). For example, if there are 16 second conductive lines 1211, the first to sixth second conductive lines 1211 are connected by a wiring 1220 located on the first bezel, and the seventh to sixteenth second conductive lines 1211 may be connected by a wiring 1220 located on the second bezel. Alternatively, even-numbered second conductive lines 1211 may be connected by a wiring 1220 located on the first bezel, and odd-numbered second conductive lines 1211 may be connected by a wiring 1220 located on the second bezel.

In some other embodiments, in the second electrode pattern 1200, a plurality of wirings 1220 for transmitting a second driving signal to the second conductive line 1211 may be connected through a plurality of second holes 3200 of the spacer layer 3000. For example, a part of the wiring 1220 is formed on a sheet or a layer other than the first sheet 1000, and may be connected to the rest part of the wiring 1220 on the first sheet 1000 through a plurality of second holes 3200 of the spacer layer 3000 located at positions corresponding to each of the plurality of second conductive lines 1211.

In some embodiments, the second conductive lines 1211 and the third conductive lines 1212 may be disposed in a horizontal or vertical direction.

The second electrode pattern 1200 may be made of a conductive material. For example, the second electrode pattern 1200 may be gold, silver, copper, carbon, nanotube, and graphene, but is not limited thereto.

The controller 4000 transmits a plurality of electrical signals (Tx_2) to the plurality of second conductive lines 1211. The controller 4000 transmits a plurality of low-frequency second driving signals corresponding to resistively sensing pressure to the plurality of second conductive lines 1211. The low-frequency second driving signal cannot pass between the first conductive line 1110 and the third conductive line 1212 on which capacitance is formed. Accordingly, the second driving signal may pass when the second conductive line 1211, the third conductive line 1212 and the conductive island pattern 2110 are in contact.

In addition, the controller 4000 receives a plurality of electrical signals (Rx_1 or Rx_2) from the plurality of third conductive lines 1212. The controller 4000 receives a first sensing signal (ADC, Analog Digital Converter) corresponding to the first driving signal in order to detect a change in capacitance from the plurality of third conductive lines 1212, and receives a second sensing signal (ADC, Analog Digital Converter) corresponding to the second driving signal from the second electrode pattern 1200 in order to detect a change in resistance.

A part of the first conductive line 1110 of the first electrode pattern 1100 and a part of the third conductive line 1212 of the second electrode pattern 1200 perform electromagnetic interaction to sense pressure in a capacitive manner, and the second conductive line 1211 and the third conductive line 1212 of the second electrode pattern 1200 and the conductive island pattern 2110 of the third electrode pattern 2100 perform electromagnetic interaction to sense pressure in a resistive manner.

The first driving signal and the second driving signal are transmitted from different time domains. For example, after the first driving signal is transmitted and the first sensing signal is received, the second driving signal is transmitted and the second sensing signal may be received.

Figure 4:
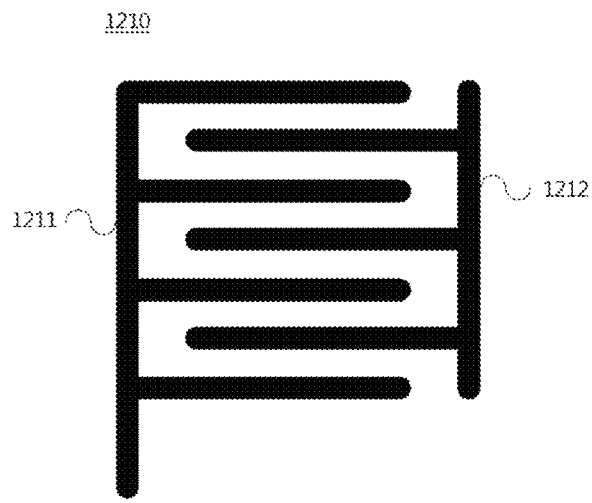
FIG. 4 is an exemplary view of a sensing cell according to an embodiment of the present disclosure.

FIG. 4 is an exemplary view of a sensing cell according to an embodiment of the present disclosure.

Referring to FIG. 4, a part of the sensing cell 1210 is formed such that the second conductive line 1211 and the third conductive line 1212 are spaced apart from each other in a complementary shape.

A part of the sensing cell 1210 is formed such that the second conductive line 1211 and the third conductive line 1212 are spaced apart in a complementary shape. A second driving signal may be applied to the second conductive line 1211, and a first sensing signal and a second sensing signal may be output to the third conductive line 1212. Accordingly, the third conductive line 1212 of the sensing cell 1210 outputs a sensing signal of the capacitive sensor and the resistive sensor.

The sensing cell 1210 may be present in various shapes. For example, the second conductive line 1211 may have a "⊏" shape (a right-side-open rectangular shape), and the third conductive line 1212 may have a shape complementary to the second conductive line 1211. In addition, the shape may be a square, a star, or a circle, but is not limited thereto.

The unit sensing cells 1210 may have a different line width and a degree of separation of the second conductive line 1211 and the third conductive line 1212 according to the locations of the plurality of unit sensing cells 1210. In addition, the unit sensing cells 1210 may have different lengths of the second conductive line 1211 and the third conductive line 1212 of a portion having a complementary shape with the unit sensing cells 1210 according to the locations of the plurality of unit sensing cells 1210. As described above, the sensing cells 1210 may be asymmetrical so that the degree of sensing for each of the plurality of sensing cells 1210 is different. For example, in a part of the sensing cell 1210 of FIG. 4, a part of the four second conductive lines 1211 is complementarily combined with a part of the three third conductive lines 1212. Among some of the second conductive lines 1211, the line width of the first line (the uppermost part of the drawing) and the line width of the second line are designed differently according to the locations of the plurality of unit sensing cells 1210, and the degree to which the second conductive line 1211 and the third conductive line 1212 are spaced apart may be designed differently according to the locations of the unit sensing cell 1210, so that the sensing signals may be different in the plurality of sensing cells 1210. Accordingly, as a method of complementing for a difference in resistance of the plurality of sensing cells 1210 according to the locations in a large-area sensor, the degree of sensing of the plurality of sensing cells 1210 may be different.

Figure 5:
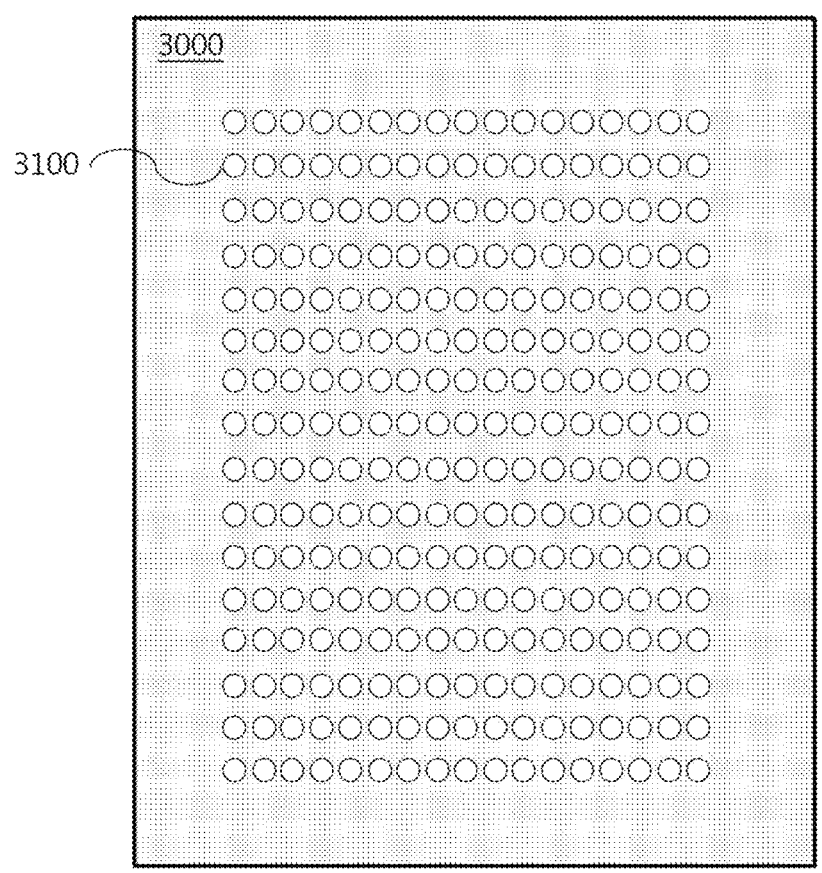
FIG. 5 is an exemplary plan view of a spacer layer according to an embodiment of the present disclosure.

FIG. 5 is an exemplary plan view of a spacer layer according to an embodiment of the present disclosure.

Referring to FIG. 5, the spacer layer 3000 includes a plurality of first holes 3100.

The spacer layer 3000 may be disposed between the first sheet 1000 and the second sheet 2000. The spacer layer 3000 includes a plurality of first holes 3100 corresponding to a unit area of the second electrode pattern 1200 and a unit area of the third electrode pattern 2100. Accordingly, the number of the first holes 3100 is equal to the number of the sensing cells 1210. The spacer layer 3000 may be made of a soft insulating material.

Figure 6:
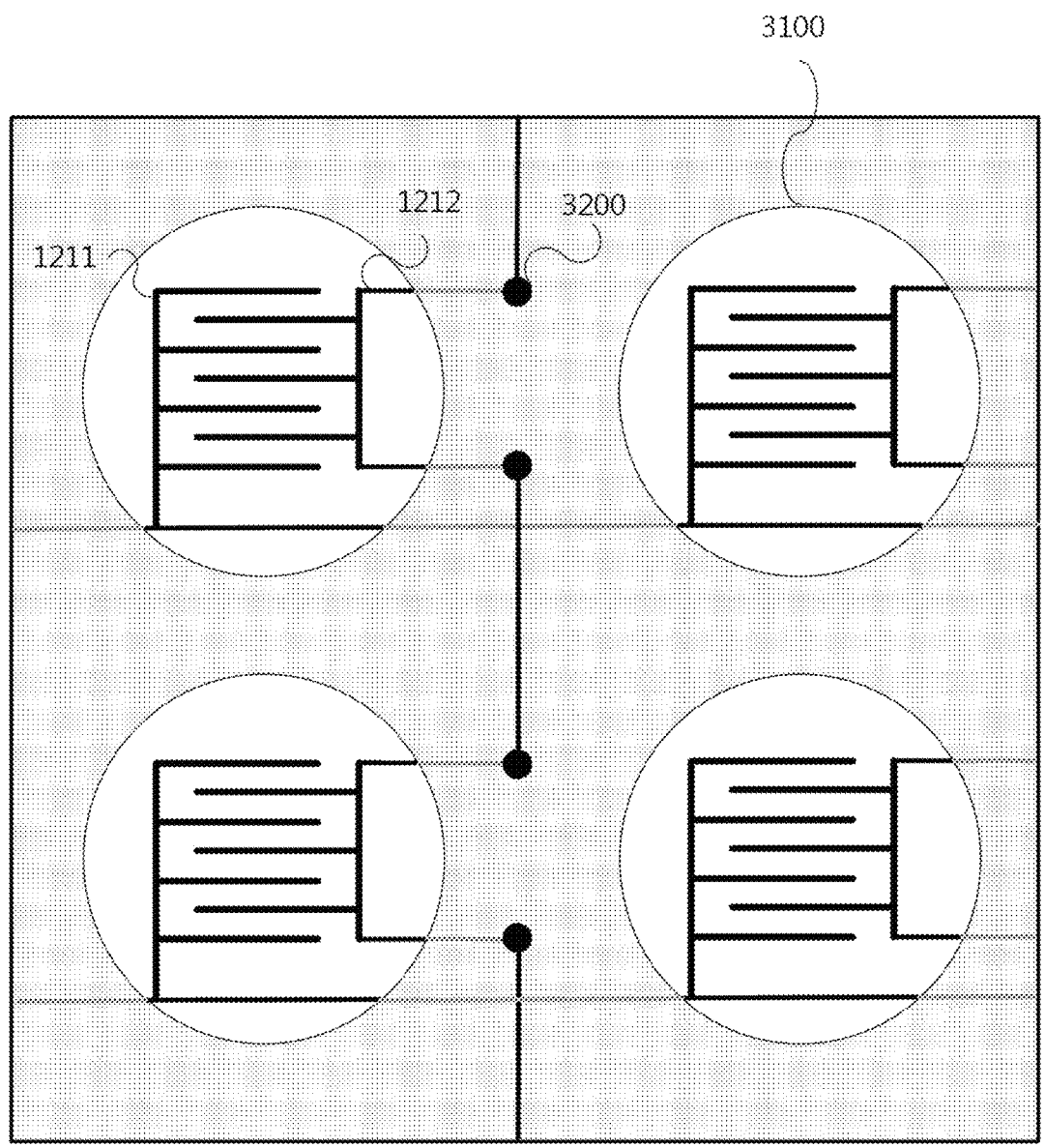
FIG. 6 is an exemplary view of a jump line of a spacer layer according to an embodiment of the present disclosure.

FIG. 6 is an exemplary view of a jump line of a spacer layer according to an embodiment of the present disclosure.

Referring to FIG. 6, a shape in which the spacer layer 3000 and the second electrode pattern 1200 are overlapped is shown.

The spacer layer 3000 includes a jump line connecting at least some of the plurality of unit areas of the second electrode pattern 1200 to each other.

The second conductive line 1211 and the third conductive line 1212 of the sensing cell 1210 intersect. However, when the second conductive line 1211 and the third conductive line 1212 intersect in the same layer, a short of the driving signal and the sensing signal occurs. Accordingly, the third conductive line 1212 (or the second conductive line 1211) is connected through a hole of the spacer layer 3000 at a point where the second conductive line 1211 and the third conductive line 1212 intersect, and is connected to another sensing cell 1210 as a jump line in the space layer.

In some embodiments, the spacer layer 3000 may include holes and jump lines connecting the wirings at the first connection part 4110 and the second connection part 4210.

Figure 7:
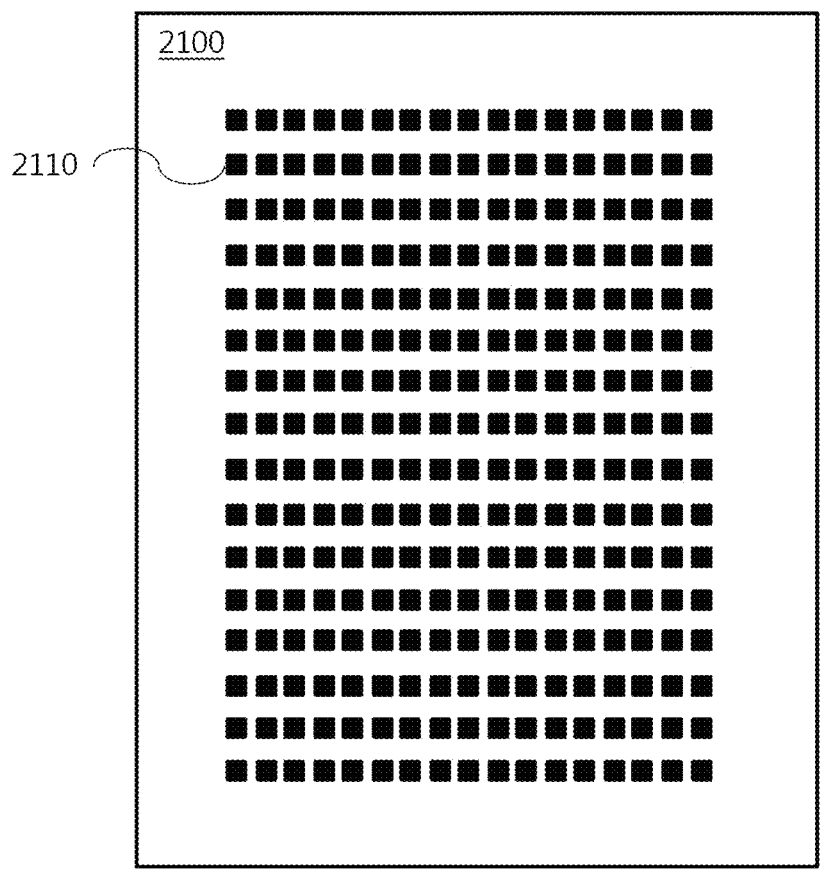
FIG. 7 is an exemplary plan view of a third electrode pattern according to an embodiment of the present disclosure.

FIG. 7 is an exemplary plan view of a third electrode pattern according to an embodiment of the present disclosure.

Referring to FIG. 7, the third electrode pattern 2100 includes a plurality of conductive island patterns.

The third electrode pattern 2100 may be disposed on a surface of the second sheet 2000 opposite to the first sheet 1000. The third electrode pattern 2100 includes a plurality of conductive island patterns 2110 spaced apart from each other. The conductive island pattern 2110 is not connected to another wiring or electrode, and forms a single unit sensing cell 1210 of a predetermined unit area of the second electrode pattern 1200, and a predetermined unit area of the third electrode pattern 2100.

The conductive island pattern 2110 contacts the second conductive line 1211 and the third conductive line 1212 through the first hole 3100 of the spacer layer 3000 when the resistive sensor operates. Accordingly, the conductive island pattern 2110 causes a change in resistance.

In some embodiments, the specific resistance of the third electrode pattern 2100 may be higher than the specific resistance of the second electrode pattern 1200. By using the relatively high specific resistance of the third electrode pattern 2100, it is possible to easily detect a change amount in resistance that occurs as a pressure is applied to the sensing cell 1210 in the resistive sensor.

The shape of the conductive island pattern 2110 may be square, triangular, or circular, but is not limited thereto. The third electrode pattern 2100 may be gold, silver, copper, carbon, nanotube, graphene, or the like, but is not limited thereto.

Figure 8:
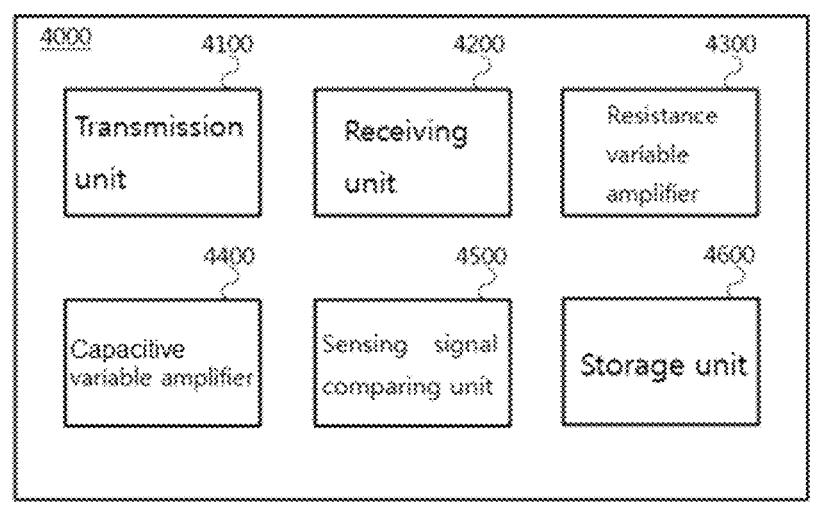
FIG. 8 is a configuration view of a controller according to an embodiment of the present disclosure.

FIG. 8 is a configuration view of a controller according to an embodiment of the present disclosure.

Referring to FIG. 8, the controller 4000 includes a transmission unit 4100, a receiving unit 4200, a resistance variable amplifier 4300, a capacitive variable amplifier 4400, a sensing signal comparing unit 4500, and a storage unit 4600.

The transmission unit 4100 transmits the first driving signal to the first conductive line 1110 and transmits the second driving signal to the second conductive line 1211.

The receiving unit 4200 receives the first sensing signal and the second sensing signal from the third conductive line 1212.

The resistance variable amplifier 4300 amplifies a driving signal or a sensing signal by reflecting a difference in resistance according to the location of the sensing cell 1210.

The capacitive variable amplifier 4400 amplifies a driving signal or a sensing signal by inferring a difference in resistance according to the location of the sensing cell 1210 from the charging and discharging time of the capacitor.

The sensing signal comparing unit 4500 compares the first sensing signal and the second sensing signal and outputs a signal for complementing for distortion generated while the sheet is bent or twisted.

The storage unit 4600 stores information output to the resistance variable amplifier 4300, the capacitive variable amplifier 4400, and the sensing signal comparing unit 4500.

Figure 9:
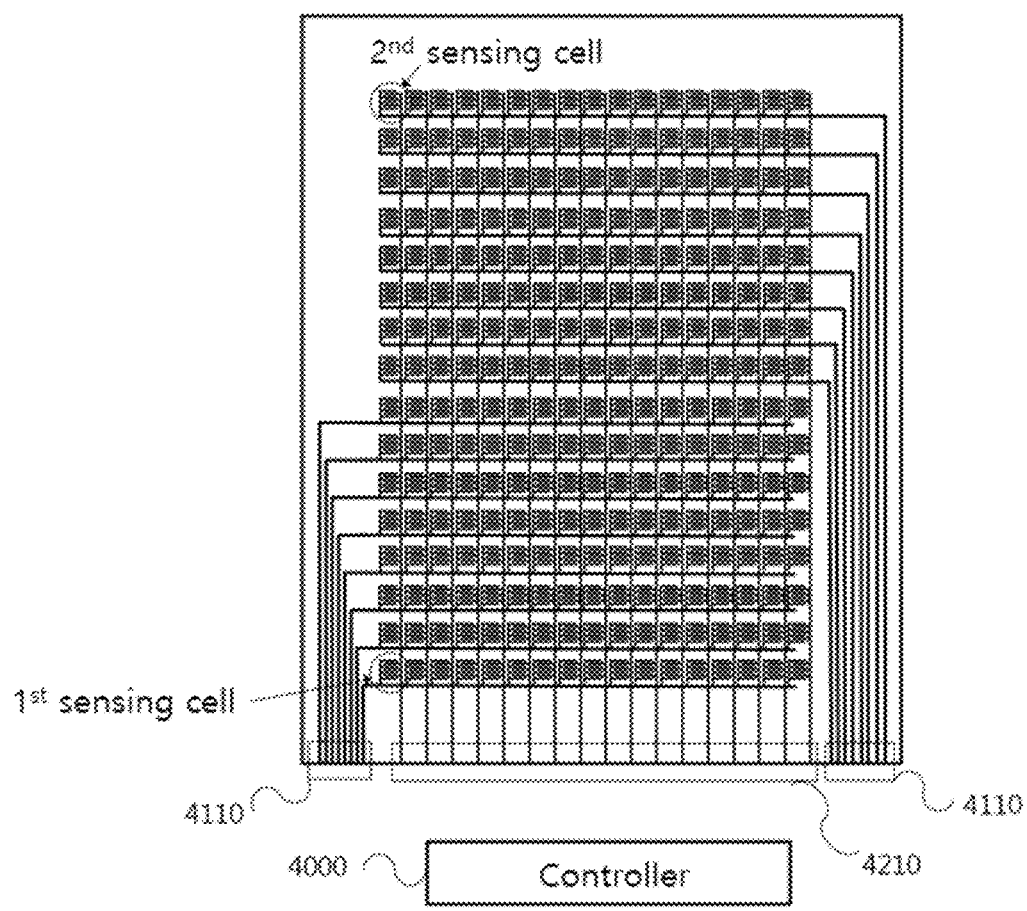
FIG. 9 is an exemplary view showing output of a complementation signal of a controller according to an embodiment of the present disclosure.

FIG. 9 is an exemplary view showing output of a complementation signal of a controller according to an embodiment of the present disclosure.

Referring to FIG. 9, a shape in which the jump line of the spacer layer 3000 and the second electrode pattern 1200 overlap each other is shown.

The wiring of the sensing cell 1210 is made of a conductive material. The conductive material of the wiring has a small specific resistance, but the resistance is proportional to the length and inversely proportional to the cross-sectional area. As the length of the wiring increases, the resistance increases. The length of the wiring from the first connection part 4110 to the first sensing cell 1210 is shorter than the length of the wiring from the first connection part 4110 to the second sensing cell 1210. Accordingly, the resistance of the wiring from the first connection part 4110 to the first sensing cell 1210 is smaller than the resistance of the wiring from the first connection part 4110 to the second sensing cell 1210.

The resistive sensor senses a change in the sum of the resistance of the wiring from the first connection part 4110 to the sensing cell 1210, the resistance generated by the pressure in the sensing cell 1210 and the resistance of the wiring from the sensing cell 1210 to the second connection part 4210. Accordingly, it is difficult for the resistive sensor that measures the change in resistance due to pressure to perform accurate sensing when the resistance of the wiring is high and when the resistance of the wiring changes according to the location of the sensing cell 1210.

The present disclosure introduces a resistance variable amplifier 4300 and a capacitive variable amplifier 4400 for complementing for a resistance difference of wirings in order to measure an appropriate pressure according to the locations of a plurality of sensing cells 1210 with a large-area pressure sensor.

Resistance Variable Amplifier

The resistive sensor senses a change in the sum of the resistance of the wiring from the first connection part 4110 to the sensing cell 1210, the resistance generated by the pressure in the sensing cell 1210 and the resistance of the wiring from the sensing cell 1210 to the second connection part 4210. Assuming that the resistance generated by the plurality of sensing cells 1210 is the same when a plurality of identical pressures are applied, accurate sensing of a resistive sensor may be performed by complementing for a difference in resistance generated by a plurality of wirings.

The controller 4000 may receive a current flowing through each wiring in real time and measure a resistance value. Since the resistance generated in a plurality of wirings may be calculated by a simple calculation (resistance=specific resistance*length*1/cross-sectional area), the controller 4000 may measure the resistance value. Accordingly, the storage unit 4600 of the controller 4000 may generate a table of resistance values measured for each of the plurality of sensing cells 1210 having different locations. The resistance variable amplifier 4300 amplifies and transmits a driving signal for complementing for a resistance difference of a wiring processed by an algorithm while reflecting a resistance value of a table in real time, or amplifies and receives a sensing signal.

Capacitive Variable Amplifier

In the capacitive sensor, a plurality of sensing cells 1210 form a capacitor. The charging/discharging time of the capacitor of the capacitive sensor may be used in complementing for a resistance difference of the wiring according to the location of the resistive sensor.

The controller 4000 applies the same AC signal to all the sensing cells 1210 in a state where no pressure is applied to the capacitive sensor, and measures the time during which the capacitor of each sensing cell 1210 is charged or discharged. The closer the sensing cell 1210 is, the faster it is charged or discharged, and the farther the sensing cell 1210 is, the later it is charged or discharged. The storage unit 4600 of the controller 4000 may store a charging/discharging time according to a location, and use a charging/discharging time to infer resistance due to wiring for each sensing cell 1210 and store it in a table. The capacitive variable amplifier 4400 amplifies and transmits a driving signal for complementing for a resistance difference of a wiring processed by an algorithm while reflecting a resistance value of a table in real time, or amplifies and receives a sensing signal.

The manufacturing cost of the third electrode pattern 2100 of the resistive sensor can be reduced by using the method of extracting a wiring resistance difference using a charging/discharge time of the capacitor of the capacitive sensor. For example, the third electrode pattern 2100 uses carbon, and the wiring of the second electrode pattern 1200 uses silver (Ag). The specific resistance of carbon is relatively higher than the specific resistance of silver, and the relatively high carbon should be used for the third electrode pattern 2100 to be higher than the resistance of the wiring. However, if the method of extracting a wiring resistance difference using a charging/discharging time of the capacitor of the capacitive sensor is used, the sensing of the resistive sensor can be performed accurately even if the resistance of the third electrode pattern 2100 is lowered. Since the carbon used for the third electrode pattern is higher in unit cost than the silver used for the second electrode pattern 1200, the manufacturing cost can be reduced in a way of reducing the amount of carbon used in the third electrode pattern 2100 by using the method described above. For example, the thickness of the third electrode pattern 2100 may be reduced, or a material used for the third electrode pattern 2100 may be used by mixing carbon and silver.

Sensing Signal Comparing Unit

In a structure in which multiple sheets are combined, such that the first sheet 1000, the second sheet 2000, and the spacer layer 3000 are combined, when the multiple sheets are bent or twisted, distortion occurs in the sensing signal. This is because there is a possibility that the degree of alignment of each sheet is warped while the multiple sheets are bent or twisted. The present disclosure detects a distortion of a sensing signal by comparing a sensing signal of a capacitive sensor with a sensing signal of a resistive sensor.

In the case of the capacitive sensor, when the sheet is bent or twisted, the sensing signal is changed by changing the thickness of the insulator between the driving electrode and the sensing electrode. However, in the case of the resistive sensor, even when the sheet is bent or twisted, the driving electrode and the sensing electrode do not contact the island pattern, so that the sensing signal may be kept unchanged. Accordingly, if there is a difference between the sensing signals of the capacitive sensor and the resistive sensor, it is possible to predict that the sheet will bend or twist, and output a signal for complementing for this.

The steps of a method or algorithm described in connection with the embodiments of the present disclosure may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form well known in the technical field to which the present disclosure pertains.

From the foregoing, although the embodiments of the present disclosure have been described with reference to the attached drawings, those skilled in the technical field to which the present disclosure pertains will understand that the present disclosure may be practiced in other detailed forms without departing from the technical spirit or essential features of the present disclosure. Therefore, it should be understood that the above-described embodiments are exemplary in all aspects rather than being restrictive.

The invention claimed is:

1. A hybrid large-area pressure sensor with a capacitive sensor and a resistive sensor integrated thereinto, the sensor comprising:
   a first electrode pattern;
   a second electrode pattern disposed below the first electrode pattern to be spaced apart from the first electrode pattern by a predetermined distance;
   a third electrode pattern disposed below the second electrode pattern to be spaced apart from the second electrode pattern by a predetermined distance; and
   a controller,
   wherein:
   a part of the first electrode pattern, a predetermined unit area of the second electrode pattern, and a predetermined unit area of the third electrode pattern form a single unit sensing cell;
   a change in distance between the first electrode pattern and the second electrode pattern causes a change in capacitance of the second electrode pattern;
   a contact between the second electrode pattern and the third electrode pattern causes a change in resistance of the second electrode pattern; and
   the controller senses pressure corresponding to the unit sensing cell by using the change in the capacitance and the change in the resistance, and wherein:
   the controller transmits a first driving signal of a first frequency to the first electrode pattern, and transmits a second driving signal of a second frequency to the second electrode pattern; and
   the first frequency and the second frequency have each different ranges.

2. The sensor of claim 1, wherein:
   the first electrode pattern includes a plurality of first conductive lines spaced apart from each other and extended in parallel in one direction; and
   at least one first conductive line among the plurality of first conductive lines is disposed in parallel with a plurality of unit areas of the second electrode pattern, and comprises a wiring connecting the plurality of first conductive lines to the controller.

3. The sensor of claim 1, wherein the unit areas of the second electrode pattern comprises a second conductive line and a third conductive line spaced apart from each other and disposed in a complementary shape, and comprises a wiring connecting the second conductive line and the third conductive line to the controller.

4. The sensor of claim 1, wherein the first driving signal transmitted to the first electrode pattern has a high frequency, and the second driving signal transmitted to the second electrode pattern has a low frequency.

5. The sensor of claim 1, wherein the controller receives a first sensing signal corresponding to the first driving signal from the second electrode pattern in order to detect a change in the capacitance and receives a second sensing signal corresponding to the second driving signal from the second electrode pattern in order to detect a change in the resistance.

6. The sensor of claim 5, wherein:
   the controller further comprises a sensing signal comparing unit that compares the first sensing signal and the second sensing signal; and
   the sensing signal comparing unit compares the first sensing signal and the second sensing signal to generate a signal for complementing for misalignment of the unit sensing cell.

7. The sensor of claim 1, wherein the unit area of the third electrode pattern includes a plurality of conductive island patterns spaced apart from each other.

8. The sensor of claim 1, further comprising:
   a first sheet having the first electrode pattern formed on one surface and the second electrode pattern formed on another surface opposite to the one surface; and
   the first sheet is made of a soft insulating material.

9. The sensor of claim 1, further comprising:
   a second sheet having the third electrode pattern formed on one surface; and
   the second sheet is made of a soft insulating material.

10. The sensor of claim 1, further comprising:
    a spacer layer having a plurality of first holes interposed between the second electrode pattern and the third electrode pattern and corresponding to a unit area of the second electrode pattern and a unit area of the third electrode pattern.

11. The sensor of claim 10, wherein the spacer layer includes a jump line connecting at least part of a plurality of unit areas of the second electrode pattern to each other.

12. The sensor of claim 10, wherein the second electrode pattern, the third electrode pattern, and the spacer layer are attached to one another by an adhesive layer, and further comprise a buffer layer for preventing a peel-off phenomenon of the adhesive layer.

13. The sensor of claim 1, wherein the first electrode pattern, the second electrode pattern, and the third electrode pattern are made of at least one conductive material among gold, silver, copper, carbon, nanotube, or graphene.

14. A hybrid large-area pressure sensor with a capacitive sensor and a resistive sensor integrated thereinto, the sensor comprising:
a first electrode pattern;
a second electrode pattern disposed below the first electrode pattern to be spaced apart from the first electrode pattern by a predetermined distance;
a third electrode pattern disposed below the second electrode pattern to be spaced apart from the second electrode pattern by a predetermined distance; and
a controller,
wherein:
a part of the first electrode pattern, a predetermined unit area of the second electrode pattern, and a predetermined unit area of the third electrode pattern form a single unit sensing cell;
a change in distance between the first electrode pattern and the second electrode pattern causes a change in capacitance of the second electrode pattern;
a contact between the second electrode pattern and the third electrode pattern causes a change in resistance of the second electrode pattern;
the controller senses pressure corresponding to the unit sensing cell by using the change in the capacitance and the change in the resistance;
the controller further includes a resistance variable amplifier; and
the resistance variable amplifier generates a complementation signal for complementing a resistance value according to a location of the unit sensing cell.

15. A hybrid large-area pressure sensor with a capacitive sensor and a resistive sensor integrated thereinto, the sensor comprising:
a first electrode pattern;
a second electrode pattern disposed below the first electrode pattern to be spaced apart from the first electrode pattern by a predetermined distance;
a third electrode pattern disposed below the second electrode pattern to be spaced apart from the second electrode pattern by a predetermined distance; and
a controller,
wherein:
a part of the first electrode pattern, a predetermined unit area of the second electrode pattern, and a predetermined unit area of the third electrode pattern form a single unit sensing cell;
a change in distance between the first electrode pattern and the second electrode pattern causes a change in capacitance of the second electrode pattern;
a contact between the second electrode pattern and the third electrode pattern causes a change in resistance of the second electrode pattern;
the controller senses pressure corresponding to the unit sensing cell by using the change in the capacitance and the change in the resistance;
the controller further includes a capacitive variable amplifier; and
the capacitive variable amplifier measures a charging or discharging time of a capacitance according to a location of the unit sensing cell, extracts a resistance value according to a location of the unit sensing cell using the time, and generates a complementation signal using the resistance value.

* * * * *